United States Patent
Martin

(12) 
(10) Patent No.: US 6,339,035 B1
(45) Date of Patent: Jan. 15, 2002

(54) CATALYST AND PROCESS FOR POLYMERIZING OLEFINS

(75) Inventor: Joel L. Martin, Bartlesville, OK (US)

(73) Assignee: Phillips Petroleum Company, Bartlesville, OK (US)

( * ) Notice: Subject to any disclaimer, the term of this patent is extended or adjusted under 35 U.S.C. 154(b) by 0 days.

(21) Appl. No.: 09/255,213

(22) Filed: Feb. 22, 1999

(51) Int. Cl.$^7$ .............................. B01J 31/00; B01J 37/00; C08F 4/02; C08F 4/60; C08F 4/44

(52) U.S. Cl. ................... 502/103; 502/117; 526/160; 526/161; 526/943

(58) Field of Search ................ 502/103, 117; 526/161

(56) References Cited

U.S. PATENT DOCUMENTS

| | | | | |
|---|---|---|---|---|
| 4,937,299 A | | 6/1990 | Ewen et al. ............... 526/119 |
| 5,039,766 A | * | 8/1991 | Sasaki et al. ............. 502/103 |
| 5,134,104 A | * | 7/1992 | Sasaki et al. ............. 502/103 |
| 5,258,476 A | * | 11/1993 | Sasaki et al. ............. 502/103 |
| 5,444,145 A | | 8/1995 | Brant et al. ............ 526/348.3 |
| 5,529,966 A | | 6/1996 | Luciani et al. ........... 502/117 |
| 5,565,396 A | * | 10/1996 | Frey et al. ............... 502/117 |
| 5,688,733 A | * | 11/1997 | Renkema et al. .......... 502/167 |
| 5,721,183 A | * | 2/1998 | Neithamer ................ 502/103 |
| 5,869,586 A | * | 2/1999 | Riedel et al. ............. 526/161 |
| 6,114,270 A | * | 9/2000 | Krishnamurti et al. ..... 502/117 |
| 6,207,608 B1 | * | 3/2001 | Jordan et al. ............ 526/161 |

OTHER PUBLICATIONS

"Metallocenes an Introduction to Sandwich Complexes", by Nicholas J. Long, Blackwell Science, Ltd. (1998) London, pp. 230–232.

*J. Am. Chem. Soc.* 114, 1708–1719 (1992), P. J. Walsh et al.

*Organometallics* 15, 4045–4053 (1996), G. M. Diamond et al.

*J. Am. Chem. Soc.* 110, 8729–8731 (1998), P. J. Walsh et al.

*J. Organomet. Chem.* 566, 287–291 (1998), R. Watchers et al.

* cited by examiner

*Primary Examiner*—Mark L. Bell
*Assistant Examiner*—J. Pasterczyk
(74) *Attorney, Agent, or Firm*—Edward L. Bowman

(57) ABSTRACT

A catalyst system comprising the product resulting from the combination of a metallocene having a monoorganoamide radical attached to the metal of the metallocene and a cocatalyst having alkylaluminum groups and the use of such catalyst systems in the polymerization of olefin.

22 Claims, No Drawings

CATALYST AND PROCESS FOR POLYMERIZING OLEFINS

FIELD OF THE INVENTION

The present invention relates to a catalyst formed by combining a monoorganoamide metallocene and a cocatalyst having alkyl aluminum functionality and to its use in the polymerization of olefins.

BACKGROUND OF THE INVENTION

In the field of olefin polymerization, there is currently much excitement generated by the employment of catalyst systems prepared by combining various metallocenes with an organoaluminum cocatalyst. Much of the excitement regarding the use of metallocenes and olefin polymerization is a result of the fact that by altering the types of organic groups in the metallocene, one can produce varying effects upon the polymerization process.

The term "metallocene" as used herein refers to those organometallic compounds in which at least one cyclodienyl group is pi-bonded to a metal of Groups IVB, VB, VIB, and VIII of the Periodic Table. A large number of metallocenes are now known, some examples include the metallocenes disclosed in such patents as U.S. Pat. No. 4,937,299; U.S. Pat. No. 5,529,966: and U.S. Pat. No. 5,444,145. In the past the metallocenes which were most often employed in forming polymerization catalysts were those in which the other remaining valences of the metal were satisfied by halogen or hydrocarbyl radicals.

There have been a few references to metallocenes in which the remaining valences are satisfied by dihydrocarbylamide radicals. One example is U.S. Pat. No. 5,529,966 and another is U.S. Pat. No. 5,444,145.

The present invention is based on the discovery that active polymerization catalysts can be formed by combining a cocatalyst having alkyl aluminum functionality with metallocenes in which there is at least one monoorganoamide radical bonded to the metal of the metallocene.

It is considered particularly surprising that such metallocenes would be effective as olefin polymerization catalysts because it is believed that those skilled in the art would have expected that when such a metallocene was combined with a cocatalyst comprising an alkyl aluminum, one would obtain an imine which would dimerize to an inactive metallocene. For example, the article by Walsh, Hollander & Bergman, J. Am. Chem. Soc., 110 (26) 8729–8733 (1988), particularly on page 8730 suggest that when such a metallocene is contacted with an alkyl aluminum, one would expect an alkylation to occur which would form an imine which would dimerize to give an inactive metallocene of the type shown in formula 2a on page 8730 of that article.

In accordance with the present invention, it has been surprisingly discovered that monoorganoamide metallocenes can, in fact, be effective as olefin polymerization catalysts when used with a cocatalyst having alkyl aluminum functionality.

Accordingly, an object of the present invention is to provide a new class of metallocenes that can be employed in the polymerization of olefins.

Another object of the present invention is to provide a new process for polymerizing olefins.

SUMMARY OF THE INVENTION

In accordance with the present invention, there is provided a catalyst system resulting from the combination of a metallocene having a monoorganoamide radical bonded to the metal of the metallocene and a cocatalyst having alkyl aluminum functionality. Further in accordance with the present invention, there is provided a process for polymerizing olefins comprising contacting at least one olefin with the inventive catalyst system under suitable polymerization conditions.

DETAILED DESCRIPTION OF THE INVENTION

The monoorganoamide metallocenes used in the present invention are those in which the monoorganoamide radical is bonded to the metal of the metallocene.

The term monoorganoamide as used herein refers to an amide radical having a hydrogen and an organo group bonded to the nitrogen which is in turn bonded to the metal of the metallocene. The organo group can be selected from any suitable organo group. Generally, the organo group would contain 1 to 20 carbon atoms. One example would be monoalkylamides. Another example would be monoarylamides. Generally the aryl group of the monoarylamide would have 6 to 20 carbon atoms. The aryl group could also have non-hydrocarbyl substituents such as halides. Monoarylamide radicals could also be referred to as anilide radicals.

Some typical monoarylamides are those in which the aryl groups are selected from aryl radicals such as phenyl, 2,6-diisopropylphenyl, 2,4-difluorophenyl, 2,6-dimethylphenyl, 2,3,4,5,6-pentafluorophenyl, 4-tertiarybutylphenyl, 2-methylphenyl, and the like.

The currently preferred metallocenes of the present invention are those of the metals of groups 4b, 5b, and 6b of the Periodic Table. The currently most preferred metals are zirconium, hafnium, and titanium. The metallocene can have one or more of the monoarylamide groups. In metallocenes in which two cyclodienyl groups are bonded to the metal, it is currently preferred for the metallocene to have two of the monoarylamide groups bonded to the metal of the metallocene. Some specific examples of what is meant by monoaryl amide metallocenes include the metallocenes bis (cyclopentadienyl) zirconium bis(2,4-difluoroanilide), bis (cyclopentadienyl) zirconium bis(monophenylamide), bis (cyclopentadienyl) zirconium bis(2,6-diisopropylphenylamide), 1-(cyclopentadienyl)-1-(9-fluorenyl)-1-(but-3-enyl)-1-(methyl) methane zirconium, bis(2,6-diisopropylphenyl amide), bis(1-methylindenyl) zirconium bis(2,6-difluorophenylamide), 1-(indenyl)-2-(9-fluorenyl) ethane zirconium bis(2,6-dimethylphenylamide), bis(cyclopentadienyl) titanium bis(2,3,4,5,6-pentafluorophenylamide), bis(n-butylcyclopentadienyl) zirconium (4-tetrabutylphenylamide) (chloride), bis(n-butylcyclopentadienyl) hafnium bis(2-methylphenylamide), and the like. The monoarylamide groups could also be referred to as monoarylamido groups.

The metallocenes of the present invention can be prepared by reacting a suitable alkali metal salt of a monoarylamide with a respective metallocene which has a halide or an alkyl group bonded to the metal of the metallocene. Examples of metallocenes which can be used as the starting material include those disclosed in U.S. Pat. No. 4,937,299 and U.S. Pat. No. 5,444,145. Examples of such preparations are disclosed in Walsh et al., J. Am. Chem. Soc. 110, 8729–8731 (1988); Wartchow and Doye, J. Organomet. Chem. 566, 287–291 (1998); and Walsh et al., J. Am. Chem. Soc. 114, 1708–1719 (1992).

The cocatalysts that can be employed in the present invention include any suitable organoaluminum compounds containing alkylaluminum functionality. Examples include trialkyl aluminum compounds, dialkyl aluminum halide compounds, dialkylaluminum hydride compounds, alkyl aluminum dihalide compounds, and alkyl aluminoxane compounds. Some specific examples include trimethyl aluminum, triethyl aluminum, triisobutyl aluminum, diethyl aluminum chloride, ethyl aluminum dichloride, ethyl aluminum sesquichloride, diethyl aluminum hydride, methyl aluminoxane, ethyl aluminoxane, and the like.

The currently preferred cocatalyst is an aluminoxane. Such compounds include those compounds having repeating units of the formula

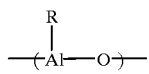

wherein R is an alkyl group generally having 1 to 5 carbon atoms.

Aluminoxanes, also sometimes referred to as poly(hydrocarbyl aluminum oxides) are well known in the art and are generally prepared by reacting an organo hydrocarbyl aluminum compound with water. The currently preferred cocatalysts are prepared either from trimethyl aluminum or triethyl aluminum, sometimes referred to as poly(methyl aluminum oxide) and poly(ethyl aluminum oxide), respectively. The currently most preferred cocatalyst is methyl aluminoxane, also referred to herein as MAO. It is also within the scope of the invention to use solid forms of the cocatalyst, such as solid methyl aluminoxane that is only sparingly soluble in toluene. One method for forming such a solid aluminoxane is disclosed in U.S. Pat. No. 5,411,925.

The amount of cocatalyst can vary over a wide range. It is currently preferred for the molar ratio of the aluminum in the aluminoxane to the transition metal in the metallocene to be in the range of about 0.1:1 to about 100,000:1 and more preferably about 5:1 to about 15,000:1.

The catalyst system can be prepared by merely combining the metallocene and the cocatalyst in any suitable manner. Typically the two are combined in a liquid in which the metallocene is soluble at a temperature in the range of about 0° C. to about 200° C., more preferably about 0° C. to 40° C. It is within the scope of the invention to prepare the catalyst system in the presence of a particulate support such as silica. It is also with the scope of the invention to prepare solid catalyst systems by contacting the catalyst system with an olefin to form a solid prepolymerized catalyst system.

The novel catalyst systems of the present invention can be used to polymerize olefins, especially alpha olefins having 2 to 12 carbon atoms. Often such polymerizations would be carried out in a homogeneous system in which the catalyst and cocatalyst were soluble; however, it is within the scope of the present invention to carry out the polymerizations in the presence of supported or insoluble particular forms of the catalyst and/or cocatalyst. The catalyst is thus considered suitable for solution, slurry, or gas phase polymerization.

The inventive catalyst systems can be used for the polymerization of a wide range of olefins, including alpha olefins having 2 to 12 carbon atoms. They can be used to polymerize ethylene in the presence or absence of other olefins, including dienes. Examples of other olefins that might be present include mono-unsaturated aliphatic alpha-olefins having 3 to 10 carbon atoms. Examples of such olefins include propylene, butene-1, pentene-1, 3-methylbutene-1, hexene-1,4-methylpentene-1,3-methylpentene-1, heptene-1, octene-1, decene-1, 4,4-dimethyl-1-pentene, 4,4-diethyl-1-hexene, 3-4-dimethyl-1-hexene, and the like and mixtures thereof.

The polymerizations can be carried out under a wide range of conditions depending upon the particular metallocene employed, and the results desired. It is considered that generally any of the polymerization procedures used in the prior art with any transition metal based catalyst systems can be employed with the present metallocene inventive compounds.

In many cases, the polymerization would be carried out in the presence of liquid diluents which do not have an adverse affect upon the catalyst system. Examples of such liquid diluents include propane, butane, isobutane, pentane, hexane, heptane, octane, cyclohexane, methylcyclohexane, toluene, xylene, and the like. The polymerization temperature can vary over a wide range, temperatures typically would be in the range of about −60° C. to about 300° C., more preferably in the range of about 20° C. to about 160° C. Typically the pressure would be in the range of from about 1 to about 500 atmospheres or greater.

The polymers produced with this invention have a wide range of uses that will be apparent to those skilled in the art from the physical properties of the respective polymer.

A further understanding of the present invention and its objects and advantages will be provided by the following examples.

EXAMPLES

Example I

A 35 weight percent dispersion of potassium hydride in mineral oil was purchased from Aldrich Chemical Company. Then 6.91 g of the dispersion was weighed into a 500 mL flask. The potassium hydride was slurried with 30 mL of THF. Then 5.5 mL of aniline in 70 mL of THF was added. The rate of addition of the aniline solution was regulated to give gentle gas evolution. The slurry was then heated gently to insure complete reaction. A small amount of potassium remained. The solution was then decanted off and added slowly to a suspension 8.8 g of di(cyclopentadienyl) zirconium dichloride, in 150 mL of toluene. After stirring overnight, the solid was stripped off under vacuum and replaced by 200 mL of toluene. The resulting slurry was then filtered. The filtrate was stripped of solvent leaving 12.33 g of a tacky yellow solid. This solid was slurried in 250 mL of heptane to remove unreacted aniline and side products. After stirring for 36 hours, a yellow solid was filtered off, dried under a vacuum, and weighed in a glove box. The amount of the solid recovered was 8.45 g. The solid was identified by $^1$H-NMR spectroscopy as bis(cyclopentadienyl) zirconium bis(monophenyl amide).

Example II

The procedure of Example I was repeated by replacing aniline with 2,6-diisopropyl aniline. The process resulted in the recovery of 3.3 g, a solid identified by $^1$H-NMR spectroscopy as the metallocene bis(cyclopentadienyl) zirconium bis(2,6-diisopropylphenyl amide).

Example III

In this example 4.4 g of a 35 weight percent slurry of potassium hydride in mineral oil was dispersed in 50 mL of 1,2-dimethoxy-ethane (DME). A mixture of 8.2 mL of hexamethyldisilazane was mixed with 10 mL of DME and this mixture was added dropwise to the potassium hydride mixture. The resulting slurry was stirred overnight and then added slowly to a mixture of 4 mL of 2,4-difluoroaniline in 20 mL of DME. After stirring overnight, the solution was added slowly to a toluene solution containing 5.56 g of dicyclopentadienyl zirconium dichloride. The resulting slurry was again stirred overnight. The solvent was stripped off and replaced by 150 mL of toluene. The solution was filtered and the filtrate was taken to dryness under a vacuum. About 150 mL of heptane was added to the resulting gummy product. The mixture was stirred for more than 24 hours and gradually gave a yellow solid. The solid was filtered off, washed with heptane, and dried under a vacuum. The amount of solid recovered was 9.7 g. The $^1$H-NMR of that solid was consistent with a product containing bis (cyclopentadienyl) zirconium bis(2,4-difluoroanilide) and the dimer having the formula as shown in 2a on page 8730 of *J. Am. Chem. Soc.* 110, 8729–8731 (1988), wherein R is 2,4-difluorophenyl. It is believed that the solid was about 75 weight percent bis(cyclopentadienyl) zirconium bis(2,4-difluoroanilide).

Example IV

The solid of Examples I–III were then evaluated to determine if they could be employed to polymerize ethylene. A control run was conducted using bis(cyclopentadienyl) zirconium dichloride. The polymerizations were carried out in a 1 gallon reactor in two liters of isobutane without hydrogen addition at 80° C. and 275 psig total pressure in the presence of 10 mL of a 10 weight percent toluene solution of aluminoxane obtained from Albemarle Corporation. In each case, a solution of the metallocene was made up in toluene and a portion of this was added to the reactor. In each case, the solution of the metallocene was made using 0.4 mmoles of the metallocene in 20 mL of toluene. The amount of the metallocene solution added to the reactor was 1 mL, accordingly resulting in 0.02 mmoles of metallocene. The results of these polymerizations are summarized in the following table.

TABLE 1

| Metallocene | MI | HLMI | Yield (g) |
|---|---|---|---|
| Example 1 | 0.007 | 1.7 | 142.4 |
| Example 2 | 0.002 | 0.65 | 136.8 |
| Example 3 | 0.0217 | 3.5 | 120.9 |
| Cp$_2$ZrCl$_2$ | 0.001 | 0.57 | 343.5 |

The productivities of the inventive catalysts are approximately equal and there were no significant differences in the molecular weight or molecular weight distribution of the polymers obtained with the inventive catalysts.

That which is claimed is:

1. A catalyst system comprising the product resulting from the combination of a metallocene of a group 4, 5, or 6 metal having a monoorganoamide bonded to the metal of the metallocene and a cocatalyst having ar alkylaluminum functional group.

2. A catalyst system according to claim 1 wherein the cocatalyst comprises an organoaluminoxane.

3. A catalyst system according to claim 2 wherein the cocatalyst comprises a trialkylaluminum.

4. A catalyst system according to claim 3 wherein the cocatalyst comprises trimethylaluminum.

5. A catalyst system according to claim 4 wherein the cocatalyst comprises methylaluminoxane and the monoorganoamide is a monoarylamide.

6. A catalyst system according to claim 5 wherein the aryl group of the monoarylamide radical is selected from the group consisting of phenyl, 2,6-diisopropylphenyl, 2,4-difluorophenyl, 2,6-dimethylphenyl, 2,3,4,5,6-pentafluorophenyl, 4-tert-butylphenyl, and 2-methylphenyl.

7. A catalyst system according to claim 6 wherein the metal of the metallocene is zirconium.

8. A catalyst system according to claim 7 wherein the aryl group of the monoarylamide radical is phenyl.

9. A catalyst system according to claim 7 wherein the aryl radical of the monoarylamide radical is 2,6-dimethylphenyl.

10. A catalyst system according to claim 7 wherein the aryl radical of the monoarylamide radical is 2,4-difluorophenyl.

11. A process for polymerizing an olefin comprising combining at least one olefin with a catalyst system as set forth in claim 1 under suitable polymerization conditions.

12. A process according to claim 11 wherein ethylene is polymerized and the cocatalyst comprises methylaluminoxane.

13. A process according to claim 12 wherein the catalyst system is produced by combining the cocatalyst with bis (cyclopentadienyl) zirconium bis(monophenyl amide).

14. A process according to claim 12 wherein the catalyst system is produced by combining the cocatalyst with bis (cyclopentadienyl) zirconium bis(2,6-diisopropylphenyl amide).

15. A process according to claim 12 wherein the catalyst system is produced by combining the cocatalyst with bis (cyclopentadienyl) zirconium bis(2,4-difluorophenyl amide).

16. A process according to claim 12 wherein the catalyst system is formed using a bridged metallocene having polymerizable unsaturation attached to at least one cyclodienyl group.

17. A process according to claim 16 wherein the catalyst system is formed using a metallocene selected from the group consisting of 1-(9-fluorenyl)-1-(cyclopentadienyl)-1-(methyl)-1-(but-3-enyl) methane zirconium bis (monoaryl amide)s.

18. A process according to claim 12 wherein the catalyst system is formed using a metallocene having an indenyl group and a fluorenyl group connected by a bridging structure wherein both the indenyl group and the fluorenyl group are pi bonded to the metal of the metallocene.

19. A catalyst system according to claim 1 wherein the metal of the metallocene is titanium, zirconium, or hafnium.

20. A catalyst system according to claim 19 wherein the metallocene has two cyclic dienyl groups pi-bonded to the metal.

21. A catalyst system according to claim 20 wherein the two cyclic dienyl groups of the metallocene are not bonded to each other.

22. A catalyst system according to claim 20 wherein the two cyclic dienyl groups of the metallocene are bonded to each other.

* * * * *